United States Patent
Pinto et al.

(10) Patent No.: US 7,408,576 B2
(45) Date of Patent: Aug. 5, 2008

(54) TECHNIQUES FOR MODIFYING IMAGE FIELD DATA AS A FUNCTION OF RADIUS ACROSS THE IMAGE FIELD

(75) Inventors: Victor Pinto, Zychron-Yaakov (IL); Erez Galil, Mountain View, CA (US)

(73) Assignee: Zoran Corporation, Sunnyvale, CA (US)

( * ) Notice: Subject to any disclaimer, the term of this patent is extended or adjusted under 35 U.S.C. 154(b) by 678 days.

(21) Appl. No.: 10/222,412

(22) Filed: Aug. 16, 2002

(65) Prior Publication Data

US 2004/0032952 A1    Feb. 19, 2004

(51) Int. Cl.
*H04N 9/64* (2006.01)
*H04N 5/225* (2006.01)

(52) U.S. Cl. ........................ 348/251; 348/335
(58) Field of Classification Search ........... 348/251, 348/241, 222.1; 358/3.09, 3.1
See application file for complete search history.

(56) References Cited

U.S. PATENT DOCUMENTS

| | | | |
|---|---|---|---|
| 4,482,975 A | 11/1984 | King et al. | |
| 4,947,445 A | 8/1990 | Sakamoto | |
| 5,181,098 A | 1/1993 | Guerin et al. | |
| 5,267,055 A | 11/1993 | Sakamoto et al. | |
| 5,621,824 A * | 4/1997 | Ijiri et al. | 382/274 |
| 5,973,735 A * | 10/1999 | Stekelenburg et al. | 348/241 |
| 6,195,469 B1 | 2/2001 | Nishioka et al. | |
| 6,323,934 B1 | 11/2001 | Enomoto | |
| 6,833,862 B1 * | 12/2004 | Li | 348/207.99 |
| 7,098,945 B1 * | 8/2006 | Sasai et al. | 348/223.1 |
| 7,268,917 B2 | 9/2007 | Watanabe et al. | |
| 2002/0025164 A1 * | 2/2002 | Suzuki | 396/429 |

(Continued)

FOREIGN PATENT DOCUMENTS

| | | |
|---|---|---|
| EP | 0720125 A | 7/1996 |
| JP | 09307789 | 11/1997 |
| JP | 10-142065 | 5/1998 |
| JP | 10-160566 | 6/1998 |
| JP | 2001-274973 | 10/2001 |

(Continued)

OTHER PUBLICATIONS

Computer Organization and Design The Hardware/Software Interface; Patterson, David A.; 1998; Morgan Kaufmann Publishers, Inc.; 2nd Ed.; Chapter 4.6; pp. 250-253.*

(Continued)

*Primary Examiner*—Lin Ye
*Assistant Examiner*—Nicholas G Giles
(74) *Attorney, Agent, or Firm*—Darby & Darby PC; John W. Branch

(57) ABSTRACT

A technique for modifying data of an image, such as can be implemented in a still camera or video recorder in order to correct for defects in its optical and/or electronic systems, includes generating data to modify the image as a function of radial position across it. A variation of the intensity across an image (lens shading) that appears in data from a two-dimensional detector is an example of an application of the technique. In order to make modifications to the data, positions of a two-dimensional raster scan pattern of an image sensor are converted to radial positions and this is then used to generate the modification data. The modification data is generated on the fly, at the same rate as the image data is being acquired, so that the modification takes place without slowing down data transfer from the image sensor.

12 Claims, 4 Drawing Sheets

U.S. PATENT DOCUMENTS

| | | | |
|---|---|---|---|
| 2002/0094131 A1* | 7/2002 | Shirakawa | 382/274 |
| 2002/0101522 A1* | 8/2002 | Hosier et al. | 348/241 |
| 2002/0135688 A1 | 9/2002 | Niikawa | |
| 2002/0165890 A1 | 11/2002 | Thakur | |
| 2003/0156190 A1 | 8/2003 | Sato et al. | |
| 2003/0156204 A1* | 8/2003 | Sato et al. | 348/222.1 |
| 2004/0095611 A1 | 5/2004 | Watanabe et al. | |
| 2004/0257454 A1 | 12/2004 | Pinto et al. | |
| 2005/0041806 A1 | 2/2005 | Pinto et al. | |

FOREIGN PATENT DOCUMENTS

| | | |
|---|---|---|
| WO | WO 02/27804 A2 | 4/2002 |
| WO | 02/059837 | 8/2002 |
| WO | 02/065760 | 8/2002 |

OTHER PUBLICATIONS

EPO/ISA, "Notification of Transmittal of the International Search Report and the Written Opinion of the International Searching Authority, or the Declaration", mailed in related PCT/US2005/000938 on Apr. 19, 2005, 15 pages.

EPO/ISA, "Notification of Transmittal of the International Search Report and the Written Opinion of the International Searching Authority, or the Declaration", mailed in related PCT/US2004/041987 on May 2, 2005, 11 pages.

Wikipedia, the Free Encyclopedia, "Taylor Series", http://en.wikipedia.org/w/index.php?title=Taylor_series&direction=prev&oldid=2432603, Jan. 7, 2004, 3 pages.

"Notification of the Transmittal of the International Search Report or the Declaration" corresponding PCT application No. PCT/US03/24189, International Searching Authority, European Patent Office, Nov. 12, 2003, 7 pages.

USPTO, "Office Action," mailed in related U.S. Appl. No. 10/749,669 on Jul. 12, 2007, 18 pages.

USPTO, "Office Action," mailed in related U.S. Appl. No. 10/770,696 on Jul. 12, 2007, 16 pages.

EPO, "Office Action," corresponding in European Patent Application No. 04 814 198.0 on Oct. 15, 2007, 4 pages.

* cited by examiner

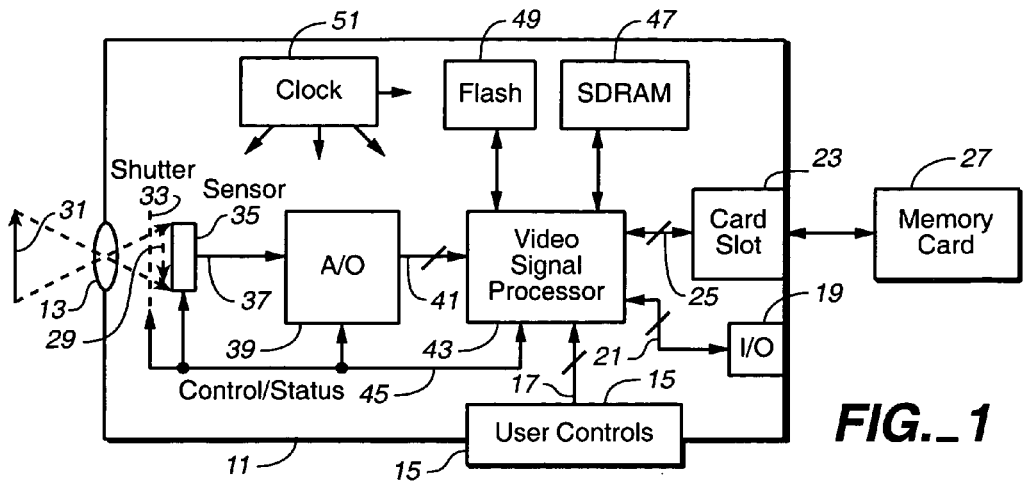
FIG._1
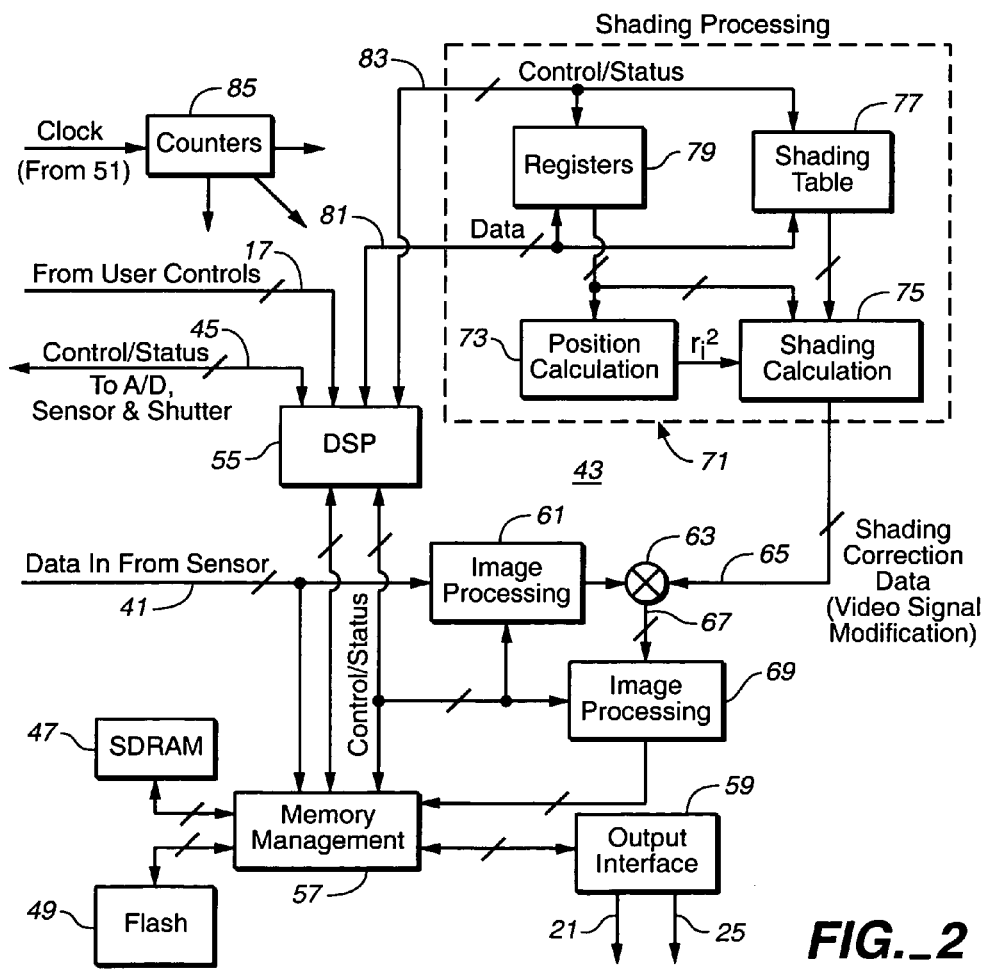
FIG._2

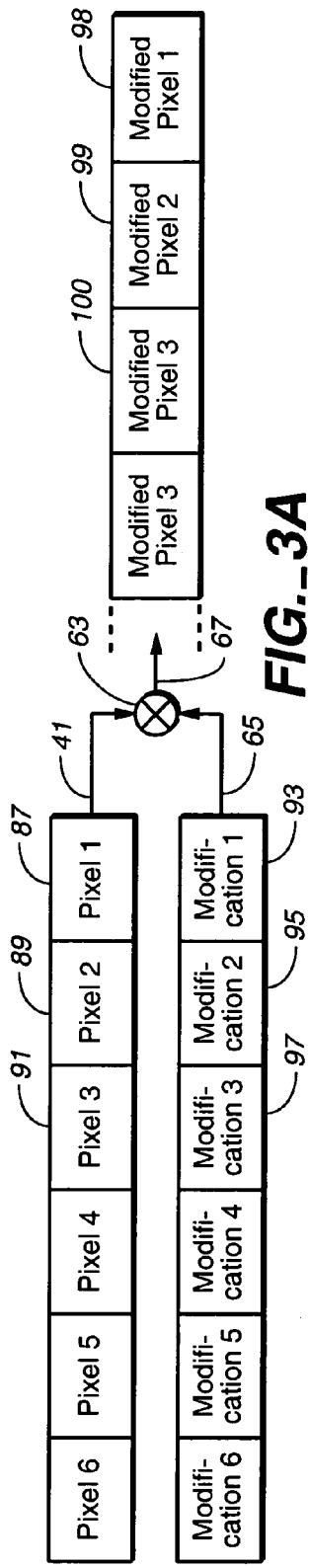
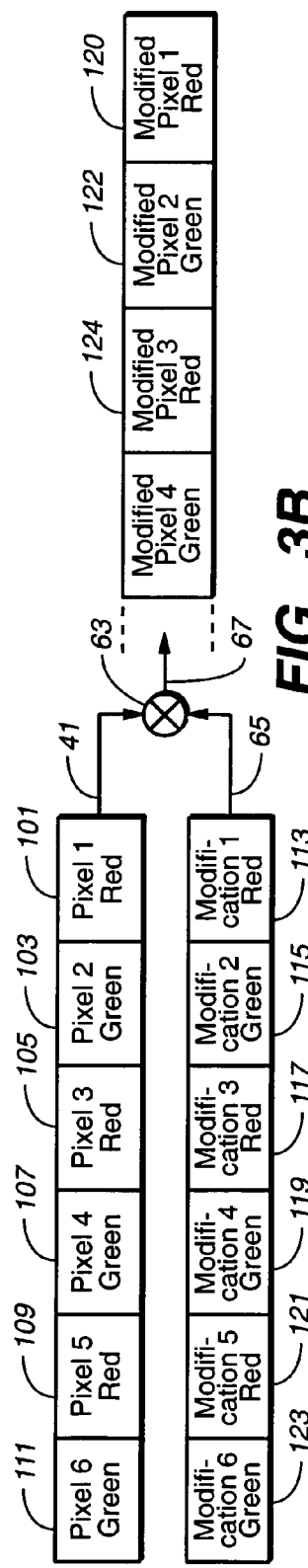
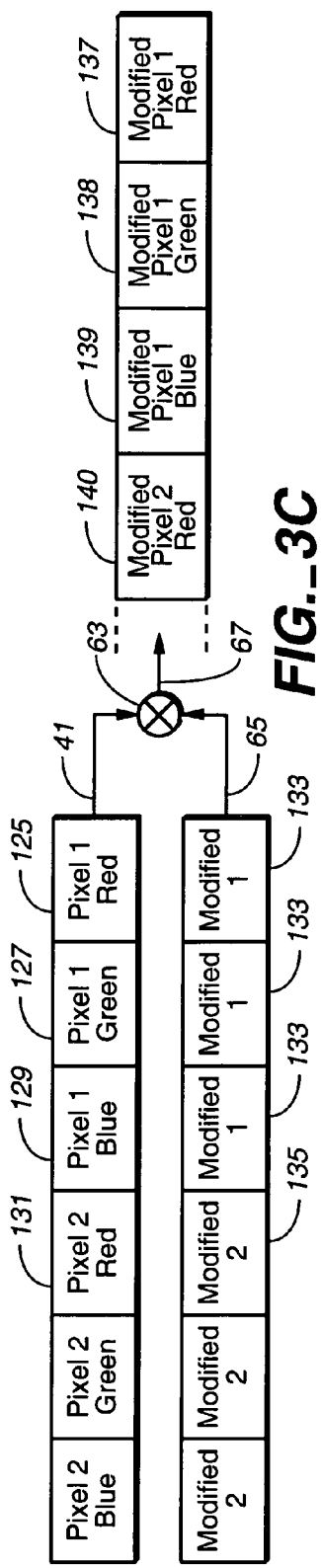

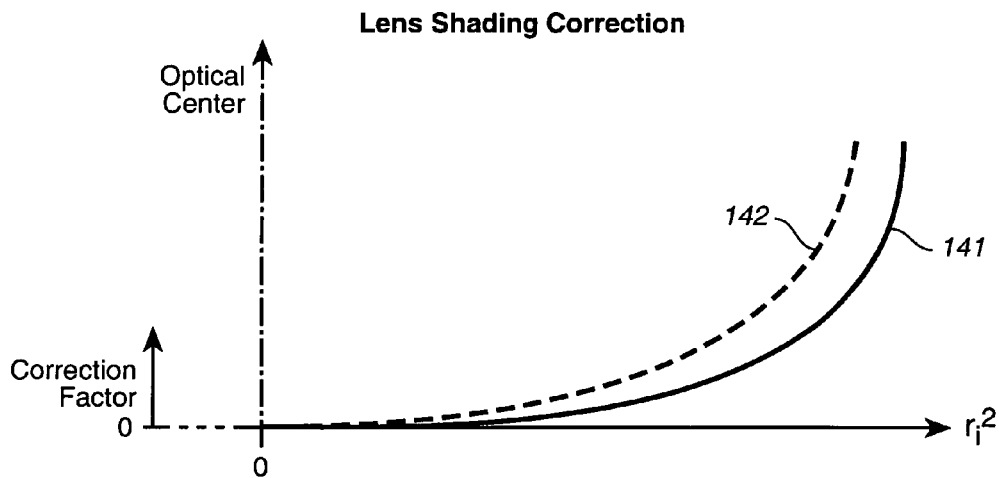
FIG._4A
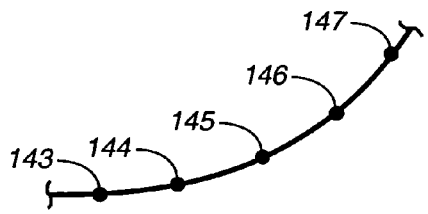
FIG._4B
Shading Table 77
| $R^2$ Interval | Red | | Green | | Blue | |
|---|---|---|---|---|---|---|
| | Base | Slope | Base | Slope | Base | Slope |
| 0 | — | — | — | — | — | — |
| 1 | — | — | — | — | — | — |
| 2 | — | — | — | — | — | — |
| 3 | — | — | — | — | — | — |
| ⋮ | • | • | • | • | • | • |
| ⋮ | • | • | • | • | • | • |
| 63 | — | — | — | — | — | — |
FIG._5

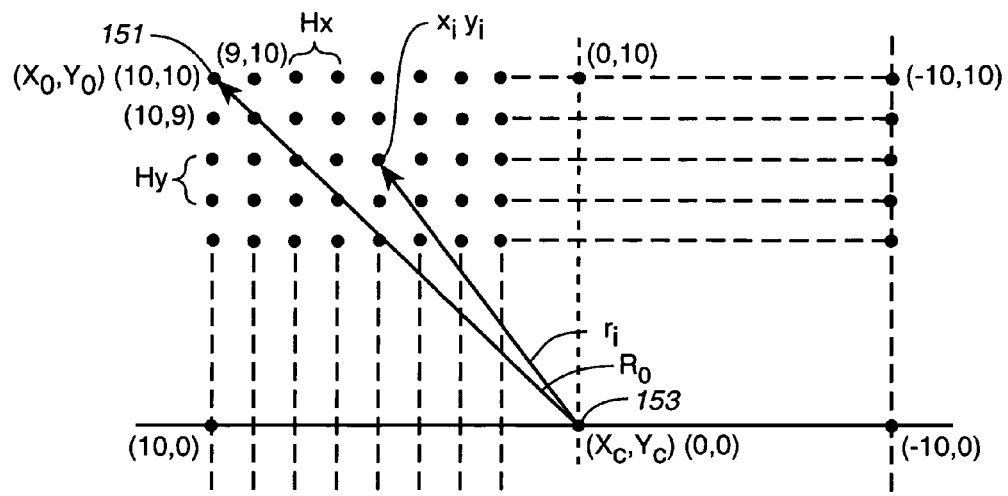
FIG._6
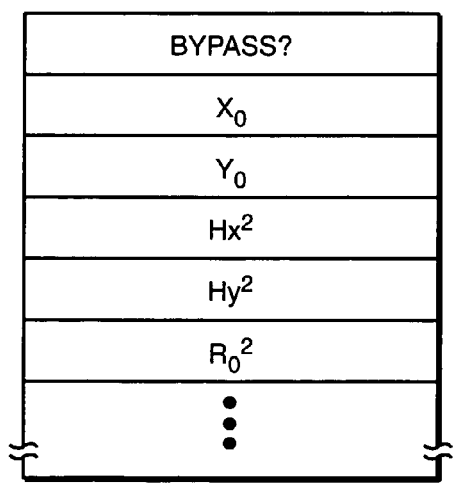
FIG._7

TECHNIQUES FOR MODIFYING IMAGE FIELD DATA AS A FUNCTION OF RADIUS ACROSS THE IMAGE FIELD

FIELD OF THE INVENTION

This invention relates generally to techniques of processing video signal data, and, more specifically, to processing video binary data to correct for variations across an imaged optical field such as, for example, to compensate for shading effects caused by lenses, sensor sensitivity variations and housing internal reflections in cameras and the like.

BACKGROUND

Lens shading is a phenomenon of a non-uniform light response across an image field of a lens. That is, a simple lens used to view a scene with a uniform light intensity across it will typically produce an image of that scene having a significantly non-uniform light intensity. The light intensity is normally highest in the middle of the image and falls off on its edges, as much as sixty percent or more. Such a lens obviously is not suitable for most optical applications without this effect being corrected. Correction can be provided by the use of a complex assembly of lenses that images scenes without imparting intensity variations across it.

Electronic cameras image scenes onto a two-dimensional sensor such as a charge-coupled-device (CCD), a complementary metal-on-silicon (CMOS) device or other type of light sensor. These devices include a large number of photo-detectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data of the intensity of radiation striking one sensor element after another as they are scanned. Color data are most commonly obtained by using photo-detectors that are sensitive to each of distinct color components (such as red, green and blue), alternately distributed across the sensor. Shading effects of lenses that image object scenes onto the sensor cause an uneven distribution of light across the photo-sensor, and thus video signals from the sensor include data of the undesired intensity variation superimposed thereon.

Rather than eliminating the lens shading effect by the use of a complex (and expensive) lens, it has been suggested that the signals from the photo-sensor may be processed in a manner to compensate for the effect. The amount of compensation applied to the signal from each photo-detector element is dependent upon the position of the element across the surface of the photo-sensor.

SUMMARY OF THE INVENTION

The electronic signal processing techniques of the present invention allow compensation for lens shading and/or other similar phenomenon, such as sensor sensitivity variations and internal camera reflections, which superimpose a predictable optical variation onto the image across the multi-element sensor. These techniques have particular application to digital cameras and other types of video devices but are not limited to such applications. The techniques may be implemented at a low cost, take practically none of the valuable space in portable devices and operate at the same rate as the video data being modified is obtained from the photo-sensor, thereby not adversely affecting the performance of the video system.

In an example of lens shading compensation, a spherical intensity correction to the video data is made by correcting the data of each image pixel by an amount that is a function of the radius of the pixel from the optical center of the image. The position of each pixel is first converted from a x-y coordinate position of the raster or other linear scanning pattern to a radial distance, and then that radial distance is used to generate the correction for the pixel from a small amount of correction information. This avoids having to keep correction data for each pixel, and thus saves having to include a large memory to store such data. Use of circuits dedicated to carrying out these operations allows them to be performed at the same rate as the video data is outputted by the photo-sensor, without having to employ an extremely fast, expensive digital signal processor. In a particular application, the radial position of a pixel is calculated from the scan position by an adder circuit.

Each camera or other optical system is calibrated, in one example, by imaging a scene of uniform intensity onto the photo-sensor and then data of a resulting spherical intensity or other variation across the photo-sensor is calculated along a single radius. Only a relatively few data points are preferably stored, in order to minimize the amount of memory required to store correction data, and a determination of values between the stored values are obtained during the image modification process by a form of interpolation. In order to avoid noticeable discontinuities in the image intensity, these few data points are preferably fit to a smooth curve that is chosen to match the intensity variation across the image that is to be corrected. In addition to correcting for lens shading, these techniques also correct for any intensity variations caused by the photo-sensor and/or its interaction with the incident image light.

Additional objects, advantages and features of the present invention are included in the following description of exemplary embodiments thereof, which description should be taken in conjunction with the accompanying drawings.

BRIEF DESCRIPTION OF THE DRAWINGS

FIG. 1 schematically illustrates an electronic video device in which the techniques of the present invention may be utilized;

FIG. 2 is a block diagram of a portion of the electronic processing system of the device of FIG. 1;

FIGS. 3A, 3B and 3C illustrate the modification of three different types of video data by the system of FIG. 2;

FIG. 4A is a curve of a sample intensity correction function across a radius of an image;

FIG. 4B illustrates one way to represent the curve of FIG. 4A with a reduced amount of data stored in a memory of FIG. 2;

FIG. 5 provides an example of a form of data representing the curve of FIG. 4A that is stored in a memory of FIG. 2;

FIG. 6 illustrates one way of calculating the radial position of an image pixel from its linear scan position by the processing system of FIG. 2; and FIG. 7 illustrates data that are stored in registers of FIG. 2.

DESCRIPTION OF EXEMPLARY EMBODIMENTS

An implementation of the techniques of the present invention is described in a camera or other video acquisition device where digital data of the image(s) are modified on the fly to compensate for intensity modifications superimposed across the image by the camera's optical system, photo-sensor and reflections from internal camera surfaces. In FIG. 1, such a camera is schematically shown to include a case 11, an imaging optical system 13, user controls 15 that generate control signals 17, a video input-output receptacle 19 with internal electrical connections 21, and a card slot 23, with internal electrical connections 25, into which a non-volatile memory card 27 is removably inserted. Data of images captured by the camera may be stored on the memory card 27 or on an internal non-volatile memory (not shown). Image data may also be outputted to another video device through the receptacle 19. The memory card 27 can be a commercially available semiconductor flash electrically erasable and programmable read-only-memory (EEPROM), small removable rotating magnetic disk or other non-volatile memory to which video data can be programmed by the camera. Alternatively, particularly when the camera is taking movies of thirty image frames per second or the like, larger capacity storage media can be used instead, such as magnetic tape or a writable optical disk.

The optical system 13 can be a single lens, as shown, but will normally be a set of lenses. An image 29 of a scene 31 is formed in visible optical radiation through a shutter 33 onto a two-dimensional surface of an image sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of video data from which the image 29 may be reconstructed. The analog signal 37 is applied to an analog-to-digital converter circuit chip 39 that generates digital data in circuits 41 of the image 29. Typically, the signal in circuits 41 is a sequence of individual blocks of digital data representing the intensity of light striking the individual photo-detectors of the sensor 35.

Processing of the video data in circuits 41 and control of the camera operation are provided, in this embodiment, by a single integrated circuit chip 43. In addition to being connected with the circuits 17, 21, 25 and 41, the circuit chip 43 is connected to control and status lines 45. The lines 45 are, in turn, connected with the shutter 33, sensor 29, analog-to-digital converter 39 and other components of the camera to provide synchronous operation of them. A separate volatile random-access memory circuit chip 47 is also connected to the processor chip 43 for temporary data storage. Also, a separate non-volatile re-programmable memory chip 49 is connected to the processor chip 43 for storage of the processor program, calibration data and the like. A usual clock circuit 51 is provided within the camera for providing clock signals to the circuit chips and other components. Rather than a separate component, the clock circuit for the system may alternatively be included on the processor chip 43.

A functional block diagram of the processor chip 43 is shown in FIG. 2. A digital signal processor (DSP) 55 is a key component, controlling both the operation of the chip 43 and other components of the camera. But since the DSP 55 does not extensively process video data, as discussed below, it may be a relatively simple and inexpensive processor. A memory management unit 57 interfaces the DSP 55 to the external memory chips 47 and 49, and to output interface circuits 59 that are connected to the input-output connector 19 and to the card slot 23 (FIG. 1) through respective circuits 21 and 25.

The flow of video data through the block diagram of FIG. 2 from the analog-to-digital converter 39 (FIG. 1) is now generally described. The input data in lines 37 is pre-processed in a block 61 and then provided as one input to a multiplier circuit 63. Another input 65 to the multiplier 63 carries data that modifies the incoming video data, the modified video data appearing at an output 67 of the multiplier 63. In this example, the modification data in lines 65 correct for the effects of lens shading and intensity variations imparted across the image by camera elements. After further image processing 69, as appropriate, the video data are directed through the memory, management unit 57 to the output interface circuits 59 and then through either lines 21 to the input-output receptacle 19 or through lines 25 to the memory card slot 23 (FIG. 1), or both, of the camera for display and/or storage.

The correction data in lines 65 are generated by a block of dedicated processing circuits 71. The block 71 includes circuits 73 that calculate a quantity related to the radial position of each image pixel from a center of the image for which video data are being acquired, in the order of such acquisition. In this specific example, this quantity is the mathematical square of the radius ($r_1^2$). This radius is calculated for each pixel from the linear position in x-y coordinates of the photo-detector(s) generating the video signal for that pixel, and at the same rate at which the video data are being received from the sensor. This conversion of linear to radial position is made since the modification of the image data varies as a function of radius across the image. That calculated radius function is then used by a calculation circuit 75 to generate the modification factor applied to the multiplier 63. Although the circuits 75 could solve an equation each time that represents the radius dependent modification to be made to the video data, a memory 77 stores a look-up table that is used in this embodiment instead. But in order to reduce the size of the memory 77, only a few points of correction data are stored and the circuits 75 calculate the values of points in between those that are stored. A set of registers 79 store parameters that are used by both of the calculation circuits 73 and 75.

The calculation circuits 73 and 75 operate independently of the DSP 55. The DSP could possibly be used to make these calculations instead but this would require an extremely fast processor, if sufficient speed were even available, would be expensive and would take considerable more space on the chip 43. The circuits 73 and 75, dedicated to performing the required repetitive calculations without participation by the DSP 55, are quite straightforward in structure, take little space on the chip 43 and frees up the DSP 55 to perform other functions.

The memory or memories 77 and 79 storing the image modification data and parameters are preferably a volatile random-access type for access speed and process compatibility with other processor circuits so that they can all be included on a single cost effective chip. The image modification data and parameters are generated once for each camera at a final stage of its manufacture and then are permanently stored in the non-volatile memory 49. These data are then loaded through lines 81 into the memories 77 and 79 each time the system is initialized, under control of the DSP 55 operating through control and status lines 83.

With reference to FIG. 3A, one aspect of the operation of the system of FIG. 2 is explained where the sensor 35 (FIG. 1) includes a single photo-detector for each image pixel. The digitized output 41 of the sensor includes successive blocks 87, 89, 91, etc. of data from adjacent photo-detectors of the sensor 35 in one row. Each block of data, containing 10, 12 or more bits that quantify the intensity of one pixel of the image 29 being sensed by a single photo-detector element, appears in the circuits 41 at a rate controlled by the system clock 51 through controlling counters 85 (FIG. 2). One of the data block 87, 89, 91, etc. can appear during each cycle of a clock signal, for example.

Data blocks 93, 95, 97, etc. are generated by the modification processing circuits 71 (FIG. 2) at the same rate and in synchronism with the image data 87, 89, 91, etc. That is, the modification data 93 are generated to appear at the multiplier 63 at the same time as the image data 87, and so on. Since the scanning pattern of the photo-detectors is known, the calculating circuits 73 generate the radii of the positions of the photo-detectors across the surface of the sensor 35 in the same order and at the same rate as the image data is read out from those photo-detectors. Modification factor data generated for a particular image pixel is then combined with data of the intensity of that pixel. Combination in the multiplier 63 of image data 87 with the generated modification data 93 for the same pixel results in modified data 98. Modified data blocks 99 and 100 are similarly obtained by combinations of data 89 and 95, and 91 and 97, respectively.

The usual video system processes data for each of multiple distinct color components of the image. A typical commercial sensor alternates photo-detectors along the rows that are covered with red, green and blue filters. There are several different arrangements of the color sensitive photo-detectors that are commercially used. In one such arrangement, one row contains alternating red and green sensitive photo-detectors, while the next row contains alternating blue and green sensitive photo-detectors, the photo-detectors also being positioned along the rows to provide alternating color sensitivity in columns. Other standard arrangements use other combinations of two alternating colors. As indicated in FIG. 3B, the output in lines 41 of one such sensor include successive pieces of red, green and blue data. Blocks 101, 103, 105, etc. represent separate data of alternating red and green sensitive photo-detectors, one block being outputted during each of successive clock cycles.

If there is only one set of correction data for all of the discrete colors being detected, an image modification factor is generated for each image pixel from that set of data, regardless of the color. This is quite adequate in cases where the variation across the image that is being removed by the signal modification affects all colors to the same or nearly the same degree. However, where the variation is significantly color dependent, separate correction factors are used for each color component. Use of color dependent modification is illustrated in FIG. 3B, wherein the successive modification factors 113, 115, 117, etc. are combined with each successive block of image data 101, 103, 105, etc. The result is modified data blocks 120, 122, 124 etc. The modification factors 113, 117, 121, etc. are taken from red correction data, while the modification factors 115, 119, 123, etc. come from green correction data.

One particular type of photo-sensor that is commercially available stacks multiple photo-detectors at each photo-site or pixel. The top detector passes the colors red and green, while filtering out the color it is sensitive to, for example blue. The detector immediately beneath this top detector passes the color green and filters out the color it is sensitive to, in this example red. The bottom sensor is then sensitive to the color green. FIG. 3C illustrates operation of the system of FIG. 2 with this type of sensor. Blocks of data 125, 127, 129, 131, etc. are outputted, three for all the colors of one pixel, another three for the next adjacent pixel, and so on. If only one set of correction data is maintained for all colors, the same modification factor is combined with the three data blocks from each photo-site, such as the modification factor 133 for the site generating the color data blocks 125, 127 and 129. If separate correction data are maintained for each color, the modification factors can be different but all three are calculated for a single radial position across the image sensor. When combined in the multiplier 63, successive modified data blocks 137, 138, 139 etc. result.

Other types of color systems can also be corrected by the techniques described herein. There was a commercial color system, for example, that used only two color components. Also, there are four-color systems in which a separate detector with a wide spectral range is used to acquire "black and white" information.

An example lens shading correction function 141 is illustrated in FIG. 4A. Keep in mind that although an isolated lens shading correction function is being shown to illustrate the invention, the invention is generally applicable to the correction of a wide variety of shading non-uniformities from numerous causes. Shading non-uniformity can be attributed to non-uniform sensor sensitivity and internal camera reflections, to name just two. If variations caused by these sources were to be corrected for in combination with variations caused by lens characteristics, the actual correction function would be different, but the general approach would be the same.

As can be seen from FIG. 4A, at an optical center of the image 29 across the photo-detector array of the sensor 35 (FIG. 1), the correction is a relative zero. The center is preferably the point of an image of an object scene having uniform intensity thereacross where the detected image intensity is maximum. The intensity of the detected image then decreases as a function of radial distance $r_1$ away from that center. As a result, the amount of intensity correction applied to the detected image signal increases as a function of the radius $r_1^2$, as indicated by the curve 141. The amount that the image intensity is increased goes up rapidly at the edge of the image. This lens shading effect has been found to be circularly symmetrical; that is, the desired correction indicated by the curve 141 is substantially the same along any radial line extending across the detected image from its optical center.

The curve 141 has been found in the general case to approximate an exponential function of the square of the radius; that is, the intensity correction for any image pixel is a function of a square of its radial distance from the optical center, $f(r_i^2)$. An equation can thus be written for each camera or other optical system that is solved by the DSP 55 or dedicated circuits for each pixel to determine the amount of correction for that pixel but it has been found to be more efficient to maintain a table of values of the curve 141 that are looked-up during the image processing. FIG. 4B shows an expanded view of a portion of the curve 141, wherein the values of successive points 143-147 are taken to represent the curve. In a specific case of camera correction, only 64 values, taken at equal increments of radius along the curve 141, are stored to represent the curve. In order to calculate the amount of correction for radii in between these points, the calculator 75 (FIG. 2) could use some interpolation algorithm but it has been found preferable to also store values of the slopes of straight lines between each successive pair of points 143-147, which the calculator 75 then also uses.

An example of the shading table 77 (FIG. 2) is-illustrated in FIG. 5. In this case, data of three separate correction curves are maintained, one for each of the primary colors red, green and blue. A second such curve 142 is shown in FIG. 4A, for example. For each of 64 intervals a base value of $r_i^2$ is stored as well as a value of the slope of a straight line from that base value to the next base value. For each value of $r_1^2$ input to the calculation circuits 75, these circuits provide values of correction factors for the red, green and blue components of the detected image in time sequence, which are then used to correct the incoming video data as previously described with respect to FIG. 3B. Of course, if each color component is to receive the same correction factor as illustrated in FIG. 3A, the table of FIG. 5 needs to maintain only one set of base and slope numbers. In either case, the amount of data stored in the table 77 is small, so the size of the memory required to be included on the chip 43 to store it can be kept small.

An example technique implemented by circuits 73 (FIG. 2) for calculating $r_1^2$ values to input to the calculation circuits 75 is illustrated in FIG. 6. The calculation is made from knowing the positions of the individual sensor photo-detectors in an x-y coordinate system, and then converting the measure of those positions to values of their radii from the optical center in a circular coordinate system. The calculation is simplified by using the fact that the photo-detectors are scanned in straight lines across the sensor 35, one row at a time, from one end to the other, in a raster pattern, until the outputs of all photo-detectors have been received to obtain a full frame of video data.

In FIG. 6, individual photo-sites or pixels are indicated by black dots. One, two, three or more photo-detectors are positioned at each pixel, depending upon the type of sensor that is used, examples of which are described above. Although a typical rectangular array contains hundreds or thousands of pixels on each side, the array of FIG. 6 is assumed to be 20 by 20 pixels in size, for purposes of explaining the calculation process. A pixel 151 is the extreme upper-left pixel of the array, with a position designated as $X_0Y_0$ since it is in the first row and first column of the array of pixels. The pixel 151 is the first pixel scanned when a frame of video data is being acquired. The other pixels in the top row are then scanned in order to obtain their signal outputs in that order, followed by scanning the pixels of the second row from the top, from the leftmost pixel to the right, and so on, in a standard video raster scanning pattern. A pixel 153 is selected to be at the center of the shading pattern of the lens that images a scene onto the photo-detector array, and its location is noted as $X_C Y_C$. The address of the shading pattern center pixel 153 is designated as $(0, 0)$. If this pixel is also the center pixel of the array, as is assumed for simplicity in this description, the pixel 151, in the small illustrative array being considered, carries an address of $(10, 10)$. The next pixel to the right has an address of $(9, 10)$, the first pixel of the second row $(10, 9)$, and so forth. The radius of the first pixel 151 from the center $X_C Y_C$ is designated as $R_0$, and that of a generalized pixel $x_iy_i$ as $r_i$.

The quantity $r_i^2$ is calculated by the circuits 73 (FIG. 2) for each pixel from its rectangular coordinates $(x_1, y_1)$. In order to greatly simplify the circuits that perform this calculation, the algorithm executed by the circuits 73 preferably relies upon arithmetic addition without the need for any of multiplication, division, square-root, or other more complicated arithmetic operations. The square of the radius of each pixel is calculated by the use of adders. This algorithm can now be described.

At the beginning of the scanning of a designated line of pixels, the initial radius $R_{INIT}$ from the center to the first pixel (left most pixel) of a given line is calculated, as follows:

$$R_{INIT}^2 = |R_0^2 - 2Y_0 H_Y + (1+2n_y)H_Y^2| \qquad (1)$$

where $Y_0$ refers to the y-coordinate of the upper most line and $R_0$ is the radius from the center $(X_C, Y_C)$ to the upper-left most pixel $(X_0, Y_0)$. The algorithm also accommodates scanning patterns that omit a proportion of the pixels or lines of pixels. The quantity $H_Y$ represents the number of lines in each step. If each line is being scanned, $H_Y=1$, if every other line is being scanned, $H_Y=2$, and so on. The quantity $n_Y$ is the number of the line actually being scanned (if lines are being skipped, $n_Y$ still counts 0, 1, 2 etc.), counting from the top where $n_Y=0$ for the second line, $n_Y=1$ for the third line, and so on.

In order to simplify the radius calculations, some of the frequently referenced quantities are calculated once during factory calibration and then permanently stored in the non-volatile memory 49 (FIG. 2) and transferred during system initialization to the register 79 (FIG. 2) as illustrated in FIG. 7. The quantities $Y_0$ and $R_0$ used in the above equation are also so stored, for example. The quantity $H_Y^2$ is also stored in the registers 79 but this can be re-written by the DSP 55 as the character of the scan changes due to the function selected by the user of the camera or other system through the controls 15 (FIG. 1). Since the radius function $R_0^2$ of the first pixel 151 to be scanned is already known, the circuits 73 need only read that value from the registers 79 and apply it to the calculating circuits 75. But the radius function for the next pixel $(9, 10)$, and the remaining pixels of a frame, need to be calculated by the circuits 73.

For each pixel along this designated line of pixels, the radius $r_i^2$ from the center $(0, 0)$ to each given pixel is calculated in order, as follows:

$$r_i^2 = |R_{INIT}^2 - 2X_0 H_X + (1+2n_X)H_X^2| \qquad (2)$$

where $R_{INIT}$ is the radius of the first pixel of the line calculated by equation (1) above, $X_0$ refers to the x-coordinate of the initial pixel of the line, $H_X$ is the number of pixels in each step, and $n_X$ is the number of the pixel actually being used (if pixels are being skipped, $n_X$ still counts 0, 1, 2, etc.), counting from the left where $n_X=0$ for the second pixel, $n_X=1$ for the third pixel, etc. A value of $X_0$ is stored in the non-volatile memory 49 during factory calibration and transferred to the registers 79 (FIG. 7) during system initialization, and $H_X^2$ is stored by the DSP 55 for the type of scan that is to take place. The registers 79 also store at least one bit that is set by the DSP 55 to indicate when the shading correction is to be omitted.

Since the scan pattern is known to move from pixel-to-pixel across one line, then the same on another line, the calculations of equations (1) and (2) need not be made for each pixel but rather the process can be considerably simplified. Since the radius function $R_0^2$ of the first pixel 151 is known, the radius function for each other pixel is calculated by building upon it. When scanning across a row, $r_i^2$ of a pixel other than the first pixel is calculated by adding the following to the radius value of the immediately preceding pixel:

$$(1+2m_X)H_X^2 \qquad (3)$$

where $m_x$ is the number of $H_X$ steps passed from the initial pixel in the row of pixels. Similarly, the $R_{INIT}^2$ of each row after the first is calculated by adding the following to the the $R_{INIT}^2$ of the immediately preceding line:

$$(1+m_Y)H_Y^2 \qquad (4)$$

where $m_y$ is the number of $H_Y$ steps passed from top row. The calculations of equations (3) and (4) are much simpler to make than those of equations (1) and (2), so the circuits 73 (FIG. 2) can be made simple and the radius function may be calculated for each successive pixel. The simplified equation (3) is derived by taking differences of the radius function of equation (2) for successive pixels in a row. Similarly, the simplified equation (4) is derived by taking differences of the radius function of equation (1) for successive lines of pixels.

Since each camera's optical system, sensor or physical configuration can have different imaging and other characteristics, each unit is preferably calibrated as part of the manufacturing process and parameters resulting from that calibration stored in the non-volatile memory 49 (FIG. 2) for transfer during system initialization to the registers 79 (FIGS. 2 and 7). A uniformly white two-dimensional scene 31 (FIG. 1) is imaged onto the sensor 35. The sensor 35 is then scanned and the image data stored directly in the memory 47 through the memory management unit 57, without lens shading correction or any other such modification. Because of the lens shading effect, however, the stored video data will not have a uniform intensity across the frame. This stored image frame data is then processed by the DSP 55 to determine the coordinates ($X_C, Y_C$) of the center pixel 153 (FIG. 6) of the optical system, which is usually the point of maximum intensity of an image 29 (FIG. 1) of a scene 31 with a uniform intensity across it. The coordinates ($X_0, Y_0$) of the upper-left corner pixel are determined by defining edges of the image frame on the photo-detector array of the sensor 35. After the center and corner coordinates have been determined, the maximum radius value $R_0^2$ is then calculated.

This process corrects for any intensity shading introduced by the optical system 13, the sensor 29 (FIG. 1), or other internal camera variations, such as reflections off of internal camera surfaces. However, if the sensor 29 needs no correction, then the correction that is made is for the lens system 13 alone. Similarly, if the lens system 13 is made to form the image 29 without imparting intensity variations across it, then the correction that is made is for the sensor 29 alone.

Although the present invention has been described with respect to certain embodiments, it will be understood that the invention is entitled to protection within the full scope of the appended claims.

It is claimed:

1. A method of modifying a digital video signal outputted from an image sensor having a two-dimensional array of individual pixels with an optical field imaged thereon, wherein a sequence of outputs of the individual pixels resulting from said pixels being linearly scanned across the optical field form the video signal, comprising:
    maintaining image modification data as a function of radial distances of the pixels from a center of the optical field imaged on the sensor,
    calculating the radial distances of the individual pixels being scanned from their linear position within the two-dimensional array,
    generating image modifications for the individual pixels being scanned from the image modification data being accessed by the calculated radial distances thereof, and
    combining the generated image modification data with the outputs of the corresponding individual pixels being scanned, thereby modifying the sequence of outputs of the individual pixels according to the image modification data,
    wherein maintaining image modification data includes storing points on a continuous curve extending along a radius across the imaged optical field from a center thereof and values of slopes between said points, the continuous curve on which the spherical intensity correction data points lie being defined by an exponential of said radius values.

2. The method of claim 1, wherein the values of said stored points are measured through the optical sensor by the device optical system viewing an image field having a uniform intensity thereacross and then fit to the continuous curve.

3. A method of correcting a digital video signal from an image sensor for intensity variations across an optical field imaged onto the image sensor by an optical system, said image sensor having a two-dimensional array of individual photo-detectors that generates the video signal as the photo-detectors are scanned in a raster pattern, comprising:
    maintaining image correction data for each of at least two color components of the optical field as a function of a radius from a center of the optical field imaged thereon in a manner enabling spherical correction of the video signal of the imaged optical field,
    calculating a radius for individual current photo-detectors from a linear distance along the scanning raster pattern between the current pixel and a prior pixel for which its radius has earlier been calculated or is known,
    utilizing the calculated radius to access the intensity corrections for one of the at least two color components of the present photo-detector from the maintained set of intensity correction data, and
    combining the intensity corrections for the current photo-detector with the image sensor video signal for the current photo-detector, thereby to correct the digital video signal.

4. A method of correcting a digital video signal outputted from an image sensor having a two-dimensional array of individual pixels with an optical field imaged thereon, comprising:
    maintaining intensity correction data of the optical field in memory along a radius from a center of the optical field imaged onto the image sensor,
    capturing data of a video signal from the individual image sensor pixels one at a time in sequence by scanning the two-dimensional array of individual pixels in a raster pattern,
    simultaneously with capturing signal data of a current pixel, calculating, in an electronic digital adder circuit, a radius for a current pixel from a linear distance along the scanning raster pattern between the current pixel and a prior pixel for which its radius has earlier been calculated or is known, and utilizing the calculated radius to access the intensity correction data for the present pixel from the maintained intensity correction data, and
    combining the intensity corrections for the current pixel with the image sensor video signal for the current pixel, thereby to correct the digital video signal without delaying capturing data from the image sensor.

5. A video imaging device, comprising:
    an optical sensor having a two-dimensional array of detectors that are scanned in a raster pattern to output a serial stream of data representative of an intensity of optical radiation thereon, an optical system fixed with respect to said sensor to image an optical radiation field onto said sensor,
    a memory storing spherical intensity correction data for the optical sensor and optical system, said correction data being stored as points on a continuous curve extending along a radius across the imaged optical field from a center thereof and values of slopes between said points, values of said stored points having been measured through the optical sensor by the device optical system viewing an image field having a uniform intensity thereacross,
    dedicated calculation circuits that convert positions of the raster scanning pattern into radial distances across the optical field,
    dedicated correction determining circuits that read values from said memory for the calculated radial distances and calculates therefrom an amount of intensity correction to be made to the serial stream of data, and combining circuits that modify the serial stream of data outputted from the optical sensor with the determined amount of intensity correction, thereby to correct the serial stream of data for intensity variations across the imaged optical field.

6. The imaging device of claim 5, wherein the continuous curve on which the spherical intensity correction data points lie being defined by an exponential of said radius.

7. The imaging device of claim 5, wherein the sensor outputs a serial stream of data representative of the intensity of a plurality individual color components of the optical radiation striking the sensor, and the memory stores correction data for each of the plurality of color components.

8. A video imaging device, comprising:

an optical sensor having a two-dimensional array of detectors that are scanned in a raster pattern to output a serial stream of data representative of intensities of a plurality of color components of an optical radiation field thereon, an optical system fixed with respect to said sensor to image the optical radiation field onto the sensor, a memory storing spherical intensity correction data for the optical sensor and optical system, said correction data being stored as points on a plurality of continuous curves that each extend along a radius across the imaged optical field from a center thereof and values of slopes between said points, values of said stored points having been measured through the optical sensor by the device optical system viewing an image field having a uniform intensity thereacross, said plurality of curves including an individual curve for each of the plurality of color components, dedicated calculation circuits that convert positions of the raster scanning pattern into radial distances across the optical field, dedicated correction determining circuits that read values from said memory for the calculated radial distances and calculates therefrom an amount of intensity correction to be made to each of the plurality of color components of the serial stream of data, and combining circuits that modify the serial stream of data outputted from the optical sensor with the determined amount of intensity correction, thereby to correct the serial stream of data for intensity variations across the imaged optical field.

9. The imaging device of claim 8, wherein the continuous curve on which the spherical intensity correction data points lie being defined by an exponential of said radius.

10. A method of modifying a digital video signal outputted from an image sensor having a two-dimensional array of individual pixels with an optical field imaged thereon, wherein a sequence of outputs of the individual pixels resulting from said pixels being linearly scanned across the optical field form the video signal, comprising:

maintaining image modification data as a function of radial distances of the pixels from a center of the optical field imaged on the sensor, wherein maintaining image modification data includes storing data of a plurality of points of a continuous curve extending along a radius across the imaged optical field from a center thereof and storing data of values of slopes of the continuous curve between the plurality of points, calculating the radial distances of the individual pixels being scanned from their linear position within the two-dimensional array, generating image modifications for the individual pixels being scanned from the image modification data being accessed by the calculated radial distances thereof, and combining the generated image modification data with the outputs of the corresponding individual pixels being scanned, thereby modifying the sequence of outputs of the individual pixels according to the image modification data.

11. A method of modifying a digital video signal outputted from an image sensor having a two-dimensional array of photo-detectors that individually output one of a plurality of distinct color components of an optical field imaged thereon, wherein the video signal is formed by a sequence of the more than one signal outputs of the individual photo-detectors resulting from said photo-detectors being linearly scanned across the optical field, comprising:

maintaining image modification data as a function of radial distances of the photo-detectors from a center of the optical field imaged on the sensor, wherein maintaining image modification data additionally includes storing data of a plurality of points of a continuous curve extending along a radius across the imaged optical field from a center thereof and storing data of values of slopes of the continuous curve between the plurality of points, and processing the sequence of signals being outputted by the individual photo-detectors at a rate at least as fast as the signal outputs are obtained from the sensor and concurrently therewith, including:

calculating the radial distances of the individual photo-detectors being scanned from their linear position within the two-dimensional array, generating image modifications for signals outputted from the individual photo-detectors from image modification data referenced by the calculated radial distances of the photo-detectors being scanned, and combining the generated image modifications with the signals outputted by the corresponding individual photo-detectors being scanned, thereby modifying the sequence of outputs of the individual photo-detectors according to the image modification data.

12. An integrated circuit chip containing circuits capable of receiving and processing a stream of data of individual photo-detectors obtained from linearly scanning a two-dimensional optical image according to a predetermined pattern, comprising:

a first portion of said circuits that determines, in synchronism with the optical image being scanned, a radial distance of the photo-detectors being scanned and operates to access stored data of spherical modifications to the scanned optical image according to said radial distance, wherein the first portion of said circuits additionally operates to access stored data of spherical modifications in a form of a plurality of points of a continuous curve extending along said radial distance, and further operates to access stored data of spherical modifications that include data of values of slopes of the continuous curve between the plurality of points, and a second portion of said circuits that operates on the incoming data and the accessed stored image modification data to output a modified stream of data of individual photo-detectors.

* * * * *